No. 781,782. PATENTED FEB. 7, 1905.
R. McGREW & W. J. ROBERTS.
VEHICLE CHOCK BRAKE.
APPLICATION FILED MAR. 25, 1904.
2 SHEETS—SHEET 1.
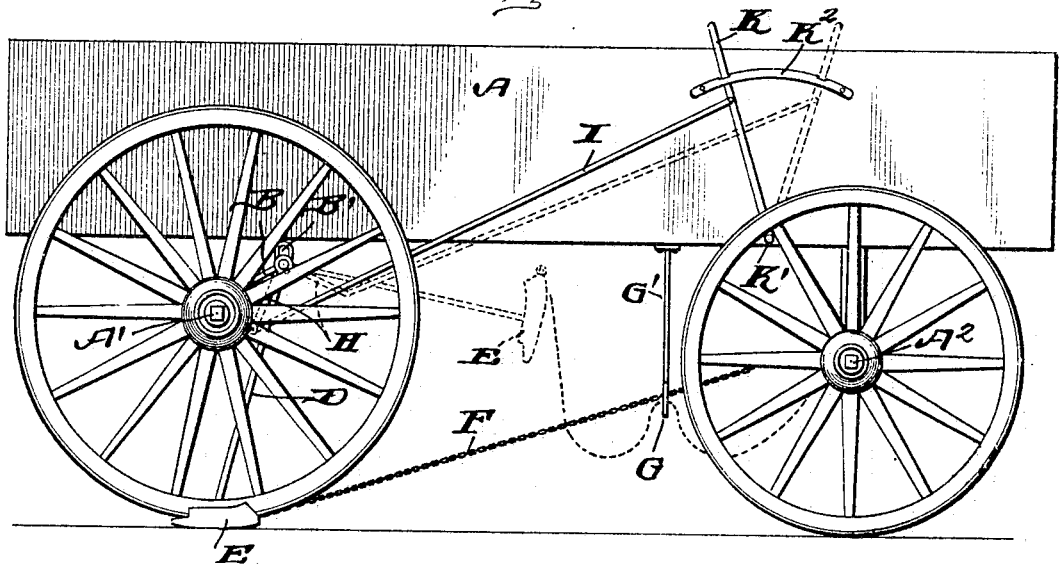
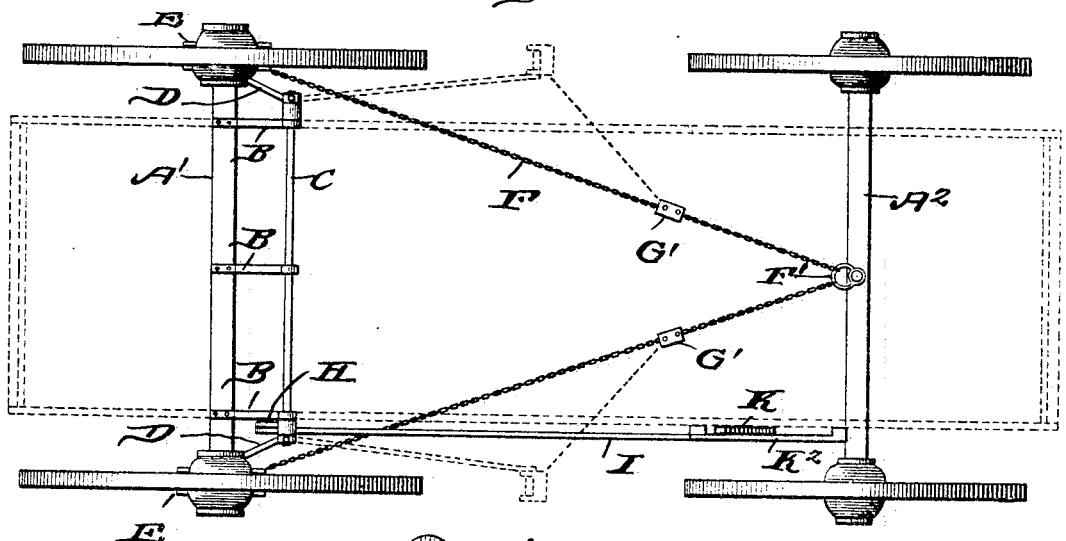

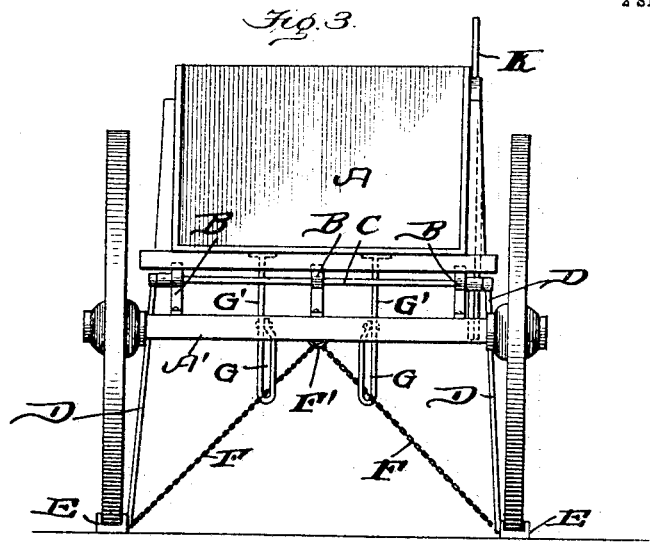
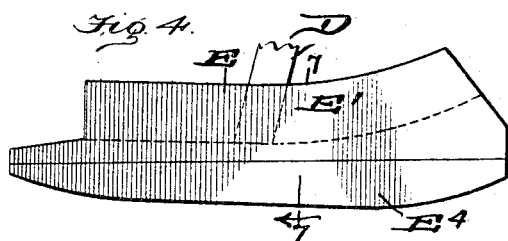
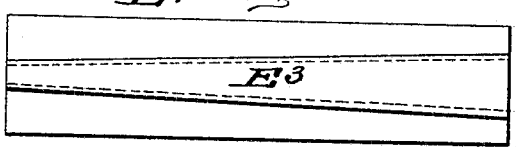
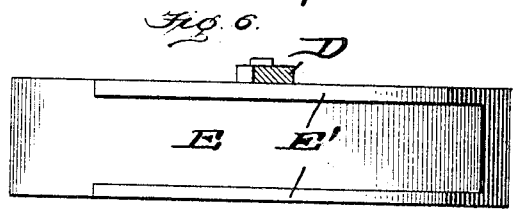
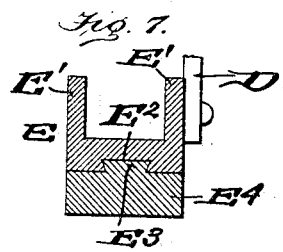
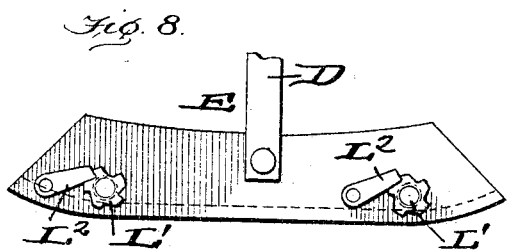
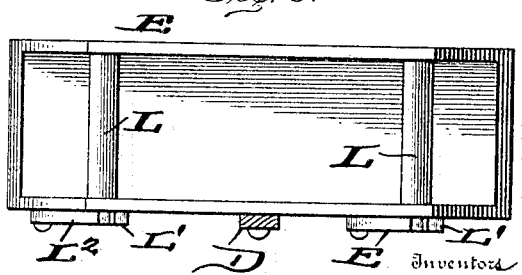

No. 781,782.

Patented February 7, 1905.

UNITED STATES PATENT OFFICE.

ROSS McGREW AND WILLIAM J. ROBERTS, OF BUTTE, MONTANA, ASSIGNORS OF ONE-THIRD TO H. E. HEATH, OF BUTTE, MONTANA.

VEHICLE CHOCK-BRAKE.

SPECIFICATION forming part of Letters Patent No. 781,782, dated February 7, 1905.

Application filed March 25, 1904. Serial No. 199,942.

*To all whom it may concern:*

Be it known that we, ROSS McGREW and WILLIAM J. ROBERTS, citizens of the United States, residing at Butte, in the county of Silverbow and State of Montana, have invented a new and useful Vehicle Chock-Brake, of which the following is a specification.

This invention is a new and useful construction of brake or chock, particularly adapted for use upon farm-wagons.

As a rule the rear wheels of heavy draft-wagons have been chocked by means of a chain connected to the spoke and rim of the wheel, and attached to the front axle. This chock has usually been applied to only one wheel and consequently there has been a tendency to make the wagon slide to one side while moving down a grade. Furthermore, it is very inconvenient for the driver to be obliged to get down from the seat and fasten the chain to the wheel each and every time a grade is reached. Furthermore, chocking the wheel by means of a chain strains the wagon unduly when sliding down a steep grade, and it is with the idea of avoiding these objections that the present form of chock-brake has been invented.

Our invention is also applicable to motor-vehicles for the purpose of affording a quick stop and at the same time avoid any strain upon the said motor-vehicle.

With these objects in view our invention consists in the novel features of construction, combination, and arrangement, all of which will be fully described hereinafter and pointed out in the claims.

In the drawings forming a part in this specification, Figure 1 is a side elevation of a vehicle provided with our improved construction of brake, said brake being shown applied in full lines and released in dotted lines. Fig. 2 is a bottom plan view of the same. Fig. 3 is an end view. Fig. 4 is a detail side view of the brake block and shoe, and Fig. 5 is a top plan view of the brake-shoe. Fig. 6 is a top plan view of the brake-block. Fig. 7 is a sectional view on the line 7 7 of Fig. 4. Figs. 8 and 9 show detail views of the brake-block employed in connection with a motor-vehicle. Fig. 10 shows a detail of construction.

Referring to the drawings, A indicates the body of the wagon, A' the rear axle, and $A^2$ the front axle. Upwardly and forwardly extending brackets B are securely fastened to the rear axle A', the upper ends of said bracket being slotted vertically, as shown at B', and mounted in the said slotted brackets is a horizontal shaft C, having arms D rigidly fastened to the opposite ends thereof, said arms carrying the brake-blocks E, which are adapted to fit beneath the rear wheels when the arms D are lowered, as most clearly shown in Figs. 1 and 3, said blocks serving as a wedge or chock and prevent the rear wheel turning. The rear portion thus slides upon the brake-blocks, and the progress is materially impeded. The rearward movement of the brake-blocks E is limited by the chains F, which are connected to said blocks and also to a ring F', connected to the front axle $A^2$.

The brake-blocks E are provided with side flanges E', between which the rear wheel fits, and the bottom of each block is formed with a tapered dovetailed groove $E^2$, in which fits the tapered dovetailed rib $E^3$, formed upon the top or inner face of the detachable brake-shoe $E^4$, it being desirable to have a detachable shoe, so that when the shoe becomes worn it can be removed and another one attached in its place, and, furthermore, a number of different sets of shoes may be employed, each pair of shoes being roughened according to the character of the work required thereof, as at times an exceedingly rough shoe may be desired and at other times a comparatively smooth one. The chains F pass through eyes or loops G, formed upon the lower ends of the depending rods G', secured to the bottom of the wagon-body A.

For the purpose of raising and lowering the arms D, which carry the brake-blocks E, we attach a lever-arm H to the shaft C. Adjacent one end and pivotally connected to the other end of this arm is the rod I, which connects to the hand-lever K, pivoted at K' to the side of the wagon-body, and by throwing said hand-lever forwardly the brake-blocks are raised, as shown in dotted lines in Fig. 1, and are held in such position by locking the lever in engagement with the notched bar $K^2$.

When it is desired to apply the brakes, the lever is thrown back and the blocks dropped to the position shown in Figs. 1 and 3, the chains F preventing the said brake-blocks passing too far beneath the wheels. The brackets B being slotted, as shown at B', permit a limited vertical movement of the shaft C, thereby relieving the said brackets of undue strain which would be placed thereon if the shaft were held against vertical movement.

In Figs. 8 and 9 we have shown a brake-block particularly adapted for use in connection with motor-vehicles, said block having rollers L, journaled between the side flanges of the block, said rollers taking up the motion of the rear wheels of the motor-vehicle when forced under said wheels, as it would injure the machinery to stop it suddenly. Each roller L has a ratchet-wheel L' mounted upon one end thereof and which is engaged by a pawl L², thereby preventing the roller's turning except in the proper direction.

It will thus be seen that we provide a brake of the kind described capable of carrying out all the objects hereinbefore mentioned.

Having thus fully described our invention, what we claim as new, and desire to secure by Letters Patent, is—

1. The combination with the axle-brackets slotted vertically, of a horizontal shaft mounted therein, arms rigidly connected to the ends of the shaft, the brake-blocks attached to the outer ends of the arms, the chains connected to said brake-blocks for the purpose of limiting their rearward movement, the lever-arm attached to the shaft, a hand-lever and a rod connecting said hand-lever and lever-arm.

2. The combination with the axle-brackets slotted vertically, of the horizontal shaft mounted in said brackets, the arms attached to said shaft, the brake-blocks connected to the arms, and having tapered dovetailed grooves, the detachable brake-shoes having tapered dovetailed ribs, the lever-arm attached to the shaft, the hand-lever and the rod connecting the hand-lever and lever-arm, together with the chains and guides for said chains, as set forth.

3. A brake-block having side flanges, the rollers journaled in said side flanges, each roller having a ratchet-wheel at one end, and a pawl, pivoted to the outer side of the flange and adapted to engage the ratchet for the purpose set forth.

ROSS McGREW.
WM. J. ROBERTS.

Witnesses:
J. D. O'Brien,
J. D. Wilson.